United States Patent
Glover

(10) Patent No.: US 10,240,097 B2
(45) Date of Patent: Mar. 26, 2019

(54) METHODS AND APPARATUSES FOR AN INTEGRATED ISOMERIZATION AND PLATFORMING PROCESS

(71) Applicant: UOP LLC, Des Plaines, IL (US)

(72) Inventor: Bryan K. Glover, Algonquin, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 15/721,895

(22) Filed: Sep. 30, 2017

(65) Prior Publication Data

US 2018/0086991 A1 Mar. 29, 2018

Related U.S. Application Data

(63) Continuation of application No. PCT/US2016/024422, filed on Mar. 28, 2016.
(Continued)

(51) Int. Cl.
*C10G 63/00* (2006.01)
*B01J 19/24* (2006.01)
(Continued)

(52) U.S. Cl.
CPC ............ *C10G 63/00* (2013.01); *B01D 3/322* (2013.01); *B01J 19/245* (2013.01);
(Continued)

(58) Field of Classification Search
CPC ........ C10G 63/00; C10G 35/12; C10G 35/14; B01J 19/245; B01J 19/2445;
(Continued)

(56) References Cited

U.S. PATENT DOCUMENTS 3,652,231 A 3/1972 Greenwood et al.
3,692,496 A 9/1972 Greenwood et al.
(Continued)

FOREIGN PATENT DOCUMENTS

CZ 279448 B6 4/1995
EP 0666109 A1 8/1995
(Continued)

OTHER PUBLICATIONS

Clause, "Trends in catalytic reforming and paraffin isomerization", 15th World Petroleum Congress (Beijing Oct. 12-16, 1997) Proceedings V2 695-703, (1998), Oct. 12, 1997.
(Continued)

*Primary Examiner* — Brian A McCaig
*Assistant Examiner* — Jason Y Chong

(57) ABSTRACT

The present disclosure generally relates to methods and systems for reforming and isomerizing hydrocarbons. More particularly, the present disclosure relates to a novel combination of two traditionally separate reforming and isomerization reaction zones. A first hydrocarbon stream comprising $C_5$-$C_6$ hydrocarbons is isomerized in a first isomerization zone. A second hydrocarbon stream comprising $C_{7+}$ hydrocarbons is reformed thus producing a $C_7$ hydrocarbon stream and a $C_8$ hydrocarbon stream. The reformed $C_7$ stream is then isomerized in a second isomerization zone.

20 Claims, 1 Drawing Sheet

Related U.S. Application Data

(60) Provisional application No. 62/141,074, filed on Mar. 31, 2015.

(51) Int. Cl.
*B01D 3/32* (2006.01)
*B01J 8/02* (2006.01)
*C10G 35/12* (2006.01)
*C10G 35/14* (2006.01)

(52) U.S. Cl.
CPC .............. *B01J 19/2445* (2013.01); *B01J 8/02* (2013.01); *B01J 2219/00006* (2013.01); *B01J 2219/24* (2013.01); *C10G 35/12* (2013.01); *C10G 35/14* (2013.01)

(58) Field of Classification Search
CPC ................... B01J 2219/00006; B01J 2219/24; B01J 8/02; B01D 3/322
See application file for complete search history.

(56) References Cited

U.S. PATENT DOCUMENTS

| | | |
|---|---|---|
| 3,706,536 A | 12/1972 | Greenwood et al. |
| 3,740,328 A | 6/1973 | Rausch |
| 3,745,112 A | 7/1973 | Rausch |
| 3,785,963 A | 1/1974 | Boyd et al. |
| 3,825,116 A | 7/1974 | Greenwood |
| 3,839,196 A | 10/1974 | Plackmann et al. |
| 3,839,197 A | 10/1974 | Greenwood et al. |
| 3,854,887 A | 12/1974 | Heinze et al. |
| 3,856,662 A | 12/1974 | Greenwood |
| 3,918,930 A | 11/1975 | Forbes et al. |
| 3,948,804 A | 4/1976 | Rausch |
| 3,981,824 A | 9/1976 | Greenwood et al. |
| 4,094,814 A | 6/1978 | Lemberger et al. |
| 4,094,817 A | 6/1978 | Olson et al. |
| 4,110,081 A | 8/1978 | Millar et al. |
| 4,367,137 A | 1/1983 | Antos et al. |
| 4,403,909 A | 9/1983 | Greenwood |
| 4,594,144 A | 6/1986 | James, Jr. et al. |
| 4,804,803 A | 2/1989 | Schmidt et al. |
| 5,036,035 A | 7/1991 | Baba et al. |
| 5,135,639 A | 8/1992 | Schmidt et al. |
| 5,139,645 A | 8/1992 | Maxwell et al. |
| 5,705,730 A | 1/1998 | Zarchy et al. |
| 5,922,639 A | 7/1999 | Alario et al. |
| 6,214,764 B1 | 4/2001 | Gillespie |
| 6,818,589 B1 | 11/2004 | Gillespie |
| 7,435,329 B1 | 10/2008 | Nafis et al. |
| 2006/0205990 A1* | 9/2006 | Rice ...................... C07C 5/2791 585/738 |

FOREIGN PATENT DOCUMENTS

| | | |
|---|---|---|
| GB | 2162534 A | 2/1986 |
| WO | 2013016008 A1 | 1/2013 |
| WO | 2016160654 A1 | 10/2016 |

OTHER PUBLICATIONS

Glass, "Nonpolluting Motor Fuels. Synergy or Competition/ Catalytic Reforming and Isomerization", Pet. Tech. (ISSN 0152-5425) N.339 32 40-44 (Mar. 1988), n 339, p. 32 40-44, Mar. 1988.
Schiferli, "Using isomerization and plafforming to make high-octane, low-benzene gasoline", AIChE 1991 Spring National Meeting (Houston Apr. 7-11, 1991) Preprint N.30c 31P, Apr. 7, 1991.
Search Report dated Jul. 7, 2016 for corresponding PCT Appl. No. PCT/US2016/024422.

* cited by examiner

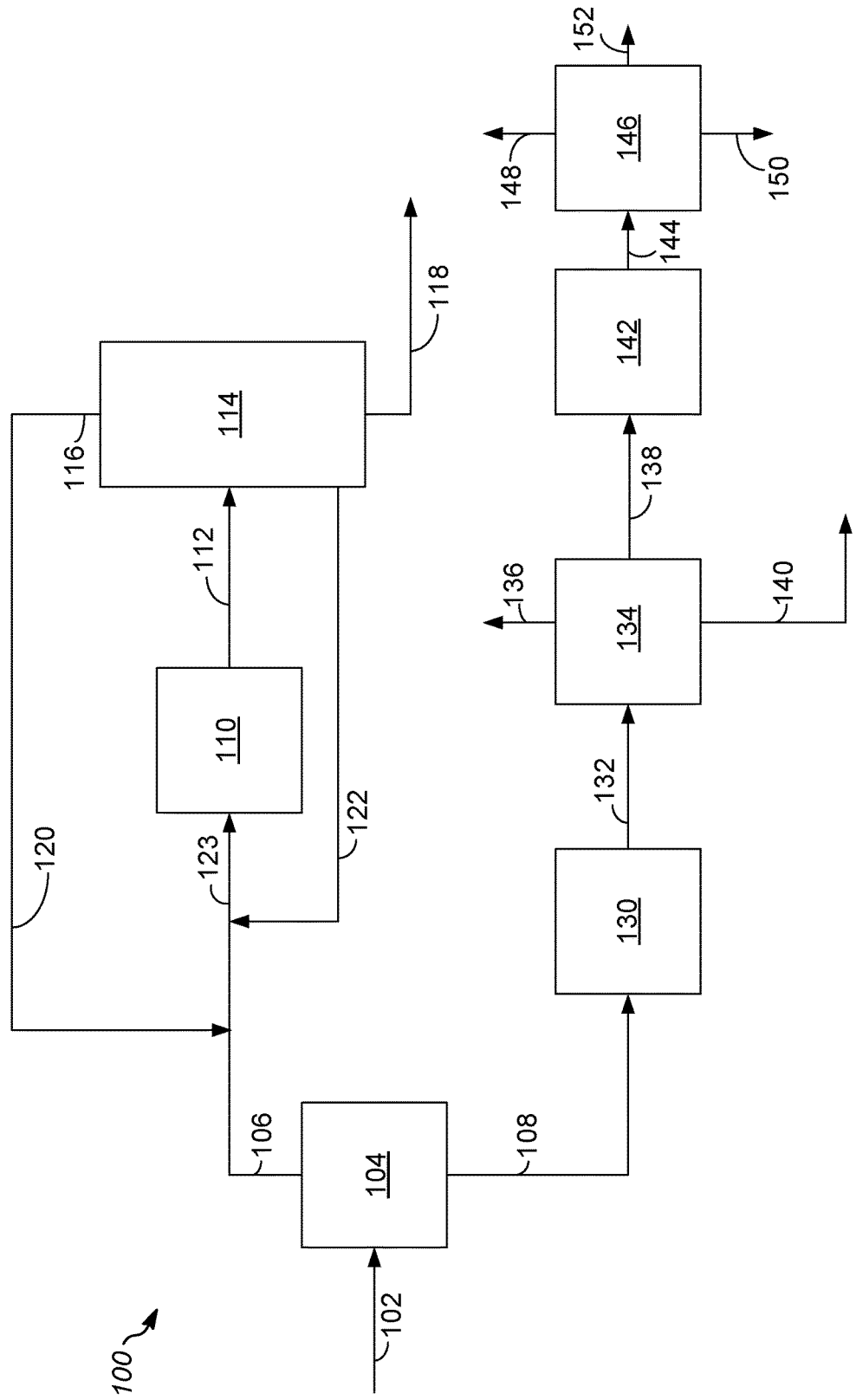

METHODS AND APPARATUSES FOR AN INTEGRATED ISOMERIZATION AND PLATFORMING PROCESS

CROSS-REFERENCE TO RELATED APPLICATIONS

This application is a Continuation of copending International Application No. PCT/US2016/024422 filed Mar. 28, 2016 which claims benefit of U.S. Provisional Application No. 62/141,074 filed Mar. 31, 2015, the contents of which cited applications are hereby incorporated by reference in their entirety

TECHNICAL FIELD

The present disclosure generally relates to methods and systems for isomerizing and reforming hydrocarbons. More particularly, the present disclosure relates to methods and systems for isomerizing a stream containing $C_5$ and $C_6$ hydrocarbons and reforming and isomerizing a stream containing $C_7$ hydrocarbons.

BACKGROUND

Modern specifications for gasoline typically place limits on aromatic content for finished gasoline. For Euro IV and V grades, the limit on aromatics is 35% max. This limitation restricts the amount of reformate that can be blended into gasoline. Since refineries typically produce 1.5 to 2.5 times as much naphtha in the $C_{7+}$ range as there is in the $C_5$-$C_6$ range, there is typically too much reformate relative to isomerate to simply blend these two materials to make finished gasoline. As a result, a refiner must include other components, either sourced externally or produced in additional units within the refinery. Refinery configurations and operations could be simplified if improved processes were available which would allow gasoline to be blended directly from isomerate and reformate. This is especially true in the case of hydrocracking based refineries focused on high distillate yields.

SUMMARY

Methods and apparatuses for isomerizing and reforming hydrocarbons are provided. In an exemplary embodiment, methods and systems for isomerizing a stream containing $C_5$ and $C_6$ hydrocarbons, and reforming and isomerizing a stream containing $C_{7+}$ hydrocarbons together employing a single reforming and isomerization reaction zone configuration.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

Definitions

As used herein, the term "stream", "feed", "product", "part" or "portion" can include various hydrocarbon molecules, such as straight-chain, branched, or cyclic alkanes, alkenes, alkadienes, and alkynes, and optionally other substances, such as gases, e.g., hydrogen, or impurities, such as heavy metals, and sulfur and nitrogen compounds. Each of the above may also include aromatic and non-aromatic hydrocarbons.

Hydrocarbon molecules may be abbreviated $C_1$, $C_2$, $C_3$, Cn where "n" represents the number of carbon atoms in the one or more hydrocarbon molecules or the abbreviation may be used as an adjective for, e.g., non-aromatics or compounds. Similarly, aromatic compounds may be abbreviated $A_6$, $A_7$, $A_8$, An where "n" represents the number of carbon atoms in the one or more aromatic molecules. Furthermore, a superscript "+" or "−" may be used with an abbreviated one or more hydrocarbons notation, e.g., $C_{3+}$ or $C_{3-}$, which is inclusive of the abbreviated one or more hydrocarbons. As an example, the abbreviation "$C_{3+}$" means one or more hydrocarbon molecules of three or more carbon atoms.

As used herein, the term "zone" can refer to an area including one or more equipment items and/or one or more sub-zones. Equipment items can include, but are not limited to, one or more reactors or reactor vessels, separation vessels, distillation towers, heaters, exchangers, pipes, pumps, compressors, and controllers. Additionally, an equipment item, such as a reactor, dryer, or vessel, can further include one or more zones or sub-zones.

As used herein, the term "rich" can mean an amount of at least generally 50%, and preferably 70%, by mole, of a compound or class of compounds in a stream.

As used herein, the term "substantially" can mean an amount of at least generally 80%, preferably 90%, and optimally 99%, by mole or weight, of a compound or class of compounds in a stream.

BRIEF DESCRIPTION OF THE DRAWING

The drawing FIGURES depict one or more implementations in accord with the present concepts, by way of example only, not by way of limitations. In the FIGURES, like reference numerals refer to the same or similar elements.

The FIGURE is a process flow diagram illustrating a method implemented on an isomerization and reforming system in accordance with various embodiments of the present disclosure.

DETAILED DESCRIPTION

The following detailed description is merely exemplary in nature and is not intended to limit the application and uses of the embodiment described. Furthermore, there is no intention to be bound by any theory presented in the preceding background or the following detailed description.

Processes and apparatuses for isomerizing and reforming hydrocarbons are provided herein. More particularly, the present disclosure relates to a novel combination of two traditionally separate reforming and isomerization reaction zones. A first hydrocarbon stream comprising $C_5$-$C_6$ hydrocarbons is isomerized in a first isomerization zone. A second hydrocarbon stream comprising $C_{7+}$ hydrocarbons is reformed in a reforming zone thus producing a $C_7$ hydrocarbon stream and a $C_8$ hydrocarbon stream. The reformed $C_7$ stream is then isomerized in a second isomerization zone where at least a portion of the $C_7$ hydrocarbons are isomerized.

The FIGURE is a process flow diagram illustrating a method implemented on a hydrocarbon isomerization and reforming apparatus 100 in accordance with various embodiments of the present disclosure. In accordance with the process and as shown in the FIGURE, a first hydrocarbon feed stream in feed line 102 is provided. The first hydrocarbon feed 102 includes hydrocarbons that have from 5 to 7 carbon atoms, and may further include various other hydrocarbons including hydrocarbons having 8 or more carbon atoms. The hydrocarbons included in the first hydrocarbon feed 102 may be aromatic, aliphatic saturated, aliphatic unsaturated, or cyclic hydrocarbons. The first hydrocarbon feed stream in feed line 102 is generally depleted of hydrocarbons that have less than 5 carbon atoms since such hydrocarbons are generally employed in other industrial processes. The first hydrocarbon feed 102 may include fresh feed, recycled feed, or by-products from refining of other fractions derived from petroleum. Furthermore, hydrogen gas ($H_2$) may provided stream in feed line via additional lines. Any suitable paraffin-containing feedstock may be used in the processes of the present disclosure. For example, naphtha feedstocks are the most often used as the feedstocks to isomerization processes. Naphtha feedstocks may include paraffins, naphthenes, and aromatics, and may include small amounts of olefins, boiling within the gasoline range. Feedstocks that may be utilized include straight-run naphthas, natural gasoline, synthetic naphthas, thermal gasoline, catalytically cracked gasoline, partially reformed naphthas, or raffinates from extraction of aromatics. The feedstock may be encompassed by the range of a full-range naphtha, or a naphtha having a boiling range from about 0° C. to about 230° C. In one embodiment, the feedstock is a light naphtha having an initial boiling point of about 10° C. to about 65° C. and a final boiling point from about 75° C. to about 110° C.

Naphtha feedstocks may contain small amounts of sulfur compounds amounting to less than about 10 mass parts per million (mppm) on an elemental basis. For example, the naphtha feedstock may have been prepared from a feedstock by a conventional pretreating step such as hydrotreating, hydrorefining, or hydrodesulfurization to convert such contaminants as sulfurous, nitrogenous and oxygenated compounds to $H_2S$, $NH_3$ and $H_2O$, respectively, which can be separated from hydrocarbons by fractionation or stripping. This conversion may employ a catalyst known to the art including an inorganic oxide support and metals selected from Groups VIB (IUPAC 6) and VIII (IUPAC 9-10) of the Periodic Table. Water can act to attenuate catalyst acidity by acting as a catalyst base, and sulfur temporarily deactivates the catalyst by platinum poisoning. Feedstock hydrotreating as described hereinabove may reduce water-generating oxygenates and remove sulfur compounds to suitable levels, so other means such as adsorption systems for the removal of sulfur and water from hydrocarbon streams generally are not required. It is within the ambit of the present disclosure that this optional pretreating step be included in the present process combination.

The first hydrocarbon feed 102 is sent to a splitter 104 that provides a first hydrocarbon stream 106 comprising hydrocarbons having from 5 to 6 carbon atoms while substantially excluding hydrocarbons having more than 6 carbon atoms. By "substantially excluding", it is meant that the hydrocarbons having 7 carbon atoms may be present in amounts of less than about 1 wt % to about 3 wt % based on the total weight of the first stream 106. However, it is also contemplated that more $C_7$ hydrocarbons may be present. The splitter 104 also provides a second hydrocarbon stream 108 includes hydrocarbons having at least 7 carbon atoms. Hydrocarbons that have 5 or 6 carbon atoms may be present in unrestricted amounts in the second hydrocarbon stream 108 provided that hydrocarbons that have at least 7 carbon atoms are also present in the second hydrocarbon stream 108 and are substantially excluded from the first hydrocarbon stream 106. The first heavy fractionation stream is generally taken to include aromatic hydrocarbons having at least 7 carbon atoms, although it is to be appreciated that some aromatic hydrocarbons having at least 7 carbons may be present in the second hydrocarbon stream 108 in accordance with limitations of conventional fractionation techniques. Although there are no specific limits to the total content in the feedstock of cyclic hydrocarbons, the feedstock in some embodiments contains between about 15 and about 60 mass-percent of cyclics including naphthenes and aromatics. The aromatics contained in the naphtha feedstock, although generally amounting to less than the alkanes and cycloalkanes, may include from about 5 to about 25 mass-percent.

In general, linear paraffins may constitute at least about 15, for example from about 40, such as at least about 50, mass-percent to essentially all of the feedstocks used in the processes of the present disclosure. For naphtha feedstocks, linear paraffins may be present in amounts of at least to about 30, for example from about 30 to about 70, mass-percent. The mass ratio of non-linear paraffins to linear paraffins in the feedstocks may be less than about 3:1, for example from about 03:1 to about 1:1. Non-linear paraffins include branched acyclic paraffins and substituted or unsubstituted cycloparaffins. Other components such as aromatics and olefinic compounds may also be present in the feedstocks as described above. Linear paraffins are typically about 25% to about 60% of the total paraffin content of the feed stream.

The first hydrocarbon stream in line 106 enters a first isomerization reaction zone 110. The first isomerization zone 110 may include more than one reactor. It should be appreciated that one, three, or more reactors may be provided in alternative embodiments. As is known in the art, the lead/lag reactor configuration in sequence enables improved isomerization through control of individual reactor temperatures and for partial catalyst replacement without a process shutdown. First isomerization reaction zone 110 operates by receiving the feed stream 123 into a reactor, wherein it is reacted at first isomerization reaction conditions to form isomerized paraffins with a higher degree of branching than the first hydrocarbon stream in line 106. The first isomerization reaction zone effluent 112 includes a combination of straight-chain paraffins, cyclo-paraffins, and isomerized paraffins.

The first isomerization reaction zone effluent 112 is passed to a deisohexanizer 114. In some embodiments, the isomerization reaction zone effluent 112 may be passed to a stabilizer before entering the deisohexanizer 114. The deisohexanizer 114 provides a lower boiling fraction containing dimethylbutanes as a product from an overhead portion (stream 116) of the deisohexanizer 114 and a higher boiling fraction containing $C_7$ and heavier hydrocarbons as a product from a bottom portion (stream 118) of the deisohexanizer 114, for example. As shown the FIGURE, the deisohexanizer 114 is also adapted to produce a side stream 122, which may include normal hexane, methylpentanes, and methylcyclopentane. The deisohexanizer 114 may be a packed or trayed column and typically operates with a top pressure of from about 50 to about 500 kPa (gauge) and a bottom temperature of from about 75° C. to about 170° C. The lower boiling fraction is provided from an overhead portion of deisohexanizer 114 via line 116. The higher boiling is provided form a bottom portion of deisohexanizer 114 via line 118.

The side-cut fraction 122 contains normal hexane, methylpentanes, and methylcyclopentane. The deisohexanizer 114 may be designed to provide a side stream that contains methyl pentanes, methylcyclopentane, normal hexane, dimethylbutanes and cyclohexane. In some embodiments, the side-cut fraction may contain about 2 to about 10 mass-percent dimethylbutanes, about 5 to about 50 mass-percent normal hexane, about 20 to about 60 mass-percent methylpentanes, and about 5 to about 25 mass-percent methylcyclopentane. The bottom stream 118 contains cyclohexane and $C_7$ and heavier hydrocarbons.

In an alternative embodiment, stream 118 may be passed to a deisoheptanizer. The deisoheptanizer may be a packed or trayed column and typically operates with a top pressure of from about 50 to about 500 kPa (gauge) and a bottom temperature of from about 75° C. to about 170° C.

The second hydrocarbon stream 108 comprising $C_7$ hydrocarbons is passed to a reforming zone 130. The reforming zone 130 includes one or more reactors, feed exchangers, and heaters for raising the temperature of the reactants as they pass to the reactors. Reaction products from the reforming zone 130 typically include a significant amount of hydrogen as well as other light ends material such as butane, propane, ethane, and methane. After removal of hydrogen rich gas, condensate from a drum may be passed in a stripping column where light ends such as ethane, propane, and butane are removed overhead while a bottoms stream comprising $C_{5+}$ hydrocarbons are collected as a product. The reformate and isomerate products may be combined to provide an octane enriched gasoline blend.

The reforming zone 130 is operated in the vapor phase with a catalyst bed temperature in the range of about 400° C. (750° F.) to about 570° C. (1050° F.). Other reforming conditions include pressures generally in the range of about 140 kPag gauge (20 psig) to about 6900 kPag (1000 psig), with pressures in the range of about 30 psig to about 500 psig being preferred. In an isomerization reforming combination process, a liquid hourly space velocity of about 0.5 to about 5.0 and a hydrogen to hydrocarbon mole ratio in an approximate range of about 1.0 to about 6.0 are typical conditions, with a liquid hourly space velocity in the range of about 1.0 to about 4.0 being preferred. The reforming zone 130 will typically contain multiple catalyst beds. Practice of this claimed subject matter may require a lower octane number from the reforming zone product such that the operating conditions employed may be less severe than typically employed in a typical reforming zone.

The catalyst beds in the reforming zone 130 may comprise a reforming catalyst which typically contain one or more Group VIII noble metals (platinum, iridium, rhodium, and palladium) and a halogen such as chlorine and/or fluorine. These components of a catalyst are supported on a porous refractory carrier material such as alumina. The reforming catalyst may also contain one or more additional metallic catalytic components such as rhenium, germanium, or tin. Further details on catalyst suitable for catalytic reforming may be obtained by reference to U.S. Pat. Nos. 3,740,328, 3,745,112, 3,948,804, and 4,367,137. Fixed bed or moving bed reactors may be used. The catalyst may, therefore, be present in the form of an extrudate or pellet. In contrast, the preferred physical form of the catalyst for use in a moving bed reaction and regeneration train is in the form of hard spherical particles having a diameter of from about 1/64 of an inch (0.0397 cm) to about 5/32 of an inch (0.397 cm). Reforming catalyst is available commercially from a number of suppliers, particularly UOP, LLC located in Des Plaines, Ill.

As mentioned above, fixed bed reforming reactors operating at a pressure equal to the isomerization zone reactor may be used. A moving bed radial flow multi-stage reactor may also be used such as is described in U.S. Pat. Nos. 3,652,231, 3,692,496, 3,706,536, 3,785,963, 3,825,116, 3,839,196, 3,839,197, 3,854,887, 3,856,662, 3,918,930, 3,981,824, 4,094,814, 4,110,081, and 4,403,909. These patents also describe catalyst regeneration systems and various aspects of moving catalyst bed operations and equipment. This reactor system has been widely employed commercially for the reforming of naphtha.

In moving bed systems, small quantities of catalyst are periodically removed from the reactors and passed into a regeneration zone. A general overview of regeneration procedures and operating conditions is presented in the previously cited U.S. Pat. Nos. 3,652,231, 3,981,824, 4,094,814, and 4,094,817. The catalyst regeneration procedure includes a carbon burnoff step, and will normally also comprise subsequent drying and halogenation steps.

The reforming zone effluent 132 is passed to a separator 134. The separator 134 produces multiple streams. The first separated stream 136 comprises hydrocarbons having less than 7 carbon atoms. In one embodiment, a portion of the first separated stream 136 comprises hydrocarbons having less than 7 carbon atoms may be sent to the deisohexanizer 114. The second separated stream 138 comprises hydrocarbons having 7 carbon atoms. The third separated stream 140 comprises hydrocarbons having 8 or more carbon atoms. The second separated stream 138 comprising hydrocarbons having 7 carbon atoms is send to the second isomerization reaction zone 142.

In some embodiments, the content of the second separated stream 138 may be adjusted to contain a portion of the third separated stream 140. For example, stream 138 may contain a small portion of $C_{8+}$ hydrocarbons in addition to $C_7$ hydrocarbons.

The second separated stream in line 138 comprising reformed $C_7$ hydrocarbons may be passed to a second isomerization zone 142. The second isomerization reaction zone 142 operates at second isomerization reaction conditions to form additional isomerized paraffins. The product of the second isomerization reaction zone 142 includes a combination of straight-chain paraffins, cyclo-paraffins, and isomerized paraffins.

In the second isomerization reaction zone 142 the second separated stream in line 138 is subjected to second isomerization zone conditions including the presence of the second isomerization catalyst in the presence of a limited but positive amount of hydrogen as described in U.S. Pat. Nos. 4,804,803 and 5,326,296. The isomerization of paraffins is generally considered a reversible first order reaction. Thus, the isomerization reaction product or effluent will contain a greater concentration of non-linear paraffins and a lesser concentration of linear paraffins and cyclo-paraffins than does the second isomerization feed 138. In some embodiments, the isomerization conditions are sufficient to isomerize at least about 20, for example, between about 30 and about 60, mass-percent of the normal paraffins and cyclo-paraffins in the isomerization feed, between the lead and lag reactors. For example, the isomerization conditions in the second isomerization reaction zone 142 achieve at least about 70, such as at least about 75, or, from about 75 to about 97, percent of equilibrium for $C_5$ paraffins and $C_6$ paraffins present in the isomerization feed 106. In many instances, the isomerization reaction effluent has a mass ratio of non-linear paraffins to linear paraffins and cyclo paraffins of at about least 2:1, for example from about 2.5 to about 4:1.

Any suitable isomerization catalyst may find application. Suitable isomerization catalysts include acidic catalysts using chloride for maintaining the sought acidity and sulfated catalysts. The isomerization catalyst may be amorphous, e.g. based upon amorphous alumina, or zeolitic. A zeolitic catalyst would still normally contain an amorphous binder. The catalyst may include a sulfated zirconia and platinum as described in U.S. Pat. No. 5,036,035 and European application 0 666 109 A1 or a platinum group metal on chlorided alumina as described in U.S. Pat. Nos. 5,705,730 and 6,214,764. Another suitable catalyst is described in U.S. Pat. No. 5,922,639. U.S. Pat. No. 6,818, 589 discloses a catalyst including a tungstated support of an oxide or hydroxide of a Group IVB (IUPAC 4) metal, for example zirconium oxide or hydroxide, at least a first component which is a lanthanide element and/or yttrium component, and at least a second component being a platinum-group metal component. These documents are incorporated herein for their teaching only as to catalyst compositions, isomerization operating conditions, and techniques.

Contacting within the second isomerization reaction zone 142 may be effected using the catalyst in a fixed-bed system, a moving-bed system, a fluidized-bed system, or in a batch-type operation. A fixed-bed system may be employed in an exemplary embodiment. The reactants may be contacted with the bed of catalyst particles in upward, downward, or radial-flow fashion. The reactants may be in the liquid phase, a mixed liquid-vapor phase, or a vapor phase when contacted with the catalyst particles. The second isomerization reaction zone 142 may include suitable means to ensure that the desired isomerization temperature is maintained at the entrance to each reactor. As noted above, the exemplary lead/lag reactor configuration in sequence enables improved isomerization through control of individual reactor temperatures and for partial catalyst replacement without a process shutdown.

Isomerization conditions in the second reaction zone 142 may include reactor temperatures that may be from about 40° C. to about 250° C. Lower reaction temperatures (within the stated range) may be employed in order to favor equilibrium mixtures having the highest concentration of high-octane highly branched isoalkanes and to minimize cracking of the feed to lighter hydrocarbons. Temperatures from about 100° C. to about 200° C. may be employed in some embodiments. Reactor operating pressures may be from about 100 kPa to about 10 MPa absolute, for example from about 0.5 MPa to about 4 MPa absolute. Liquid hourly space velocities may be from about 0.2 to about 25 volumes of isomerizable hydrocarbon feed per hour per volume of catalyst, for example from about 0.5 to about 15 hr$^{-1}$.

Hydrogen may be optionally admixed with or remains with the second separated stream in line 138 from the reforming zone 142 to the isomerization reactors to provide a mole ratio of hydrogen to hydrocarbon feed of from about 0.01 to about 20, for example from about 0.05 to about 5. The hydrogen feed may be supplied totally from outside the process or supplemented by hydrogen recycled to the feed after separation from the second isomerization zone effluent. Light hydrocarbons and small amounts of inerts such as nitrogen and argon may be present in the hydrogen. Water may be removed from hydrogen supplied from outside the process, for example by an adsorption system as is known in the art.

If a chlorided catalyst is used for isomerization, the isomerization reaction effluent may additionally use caustic scrubbing or the isomerization reaction effluent may be contacted with a sorbent to remove any chloride components. Suitable systems therefore are disclosed in U.S. Pat. No. 5,705,730.

The second isomerization zone product exits via stream 144. In one embodiment stream 144 may be sent to final gasoline blending. In another embodiment, stream 144 may be sent to a deisoheptanizer unit, in order to upgrade a significant portion of low octane paraffins. In this embodiment, the isomerization reaction zone effluent 144 may be passed to a stabilizer before entering the deisoheptanizer 146. The deisoheptanizer 146 provides a lower boiling fraction containing dimethylbutanes as a product from an overhead portion (stream 148) of the deisoheptanizer 146 and a higher boiling fraction containing $C_7$ cyclics and heavier hydrocarbons as a product from a bottom portion (stream 150) of the deisoheptanizer 146, for example. As shown the FIGURE, the deisoheptanizer 146 is also adapted to produce a side stream 152, which may include normal heptane, methylhexanes, and methylcyclohexane. The deisoheptanizer 146 may be a packed or trayed column and typically operates with a top pressure of from about 50 to about 500 kPa (gauge) and a bottom temperature of from about 105° C. to about 200° C. The lower boiling fraction is provided from an overhead portion of deisoheptanizer 146 via line 148. The higher boiling is provided form a bottom portion of deisoheptanizer 146 via line 150.

The side-cut fraction 152 contains normal heptane, methylheptanes, and methylcyclohexane. In some embodiments, the side-cut fraction may contain about 2 to about 20 mass-percent dimethylpentanes, about 5 to about 50 mass-percent normal heptane, about 20 to about 60 mass-percent methylhexanes, and about 5 to about 25 mass-percent methylcyclohexane. The deisoheptanizer 146 may be designed to provide a side stream that contains methyl hexanes, methylcyclohexane, normal heptanes and dimethylpentanes. The bottom stream 150 contains methyl cyclohexane and $C_8$ and heavier hydrocarbons.

It should be noted that various changes and modifications to the presently preferred embodiments described herein will be apparent to those skilled in the art. Such changes and modifications may be made without departing from the spirit and scope of the present disclosure and without diminishing its attendant advantages.

Specific Embodiments

While the following is described in conjunction with specific embodiments, it will be understood that this description is intended to illustrate and not limit the scope of the preceding description and the appended claims.

A first embodiment of the invention is a method for isomerizing and reforming hydrocarbons comprising feeding a feed stream comprising $C_{5+}$ hydrocarbons to a splitter to form a first hydrocarbon stream comprising mainly $C_5$-$C_6$ hydrocarbons and a second hydrocarbon stream comprising mainly $C_7$ hydrocarbons; feeding the first hydrocarbon feed stream comprising mainly $C_5$-$C_6$ hydrocarbons to a first isomerization reaction zone comprising a first isomerization catalyst to form a first isomerization reaction zone effluent stream; and feeding the second hydrocarbon stream comprising mainly $C_{7+}$ hydrocarbons to a reforming zone to form a reforming zone effluent stream; feeding the reforming zone effluent stream to a separator to form a first separated hydrocarbon stream comprising $C_7$ hydrocarbons and a second separated hydrocarbon stream comprising $C_{8+}$ hydrocarbons; and feeding the first separated hydrocarbon stream comprising $C_7$ hydrocarbons to a second isomerization reaction zone comprising a second isomerization catalyst to form a second isomerization reaction zone effluent stream. An embodiment of the invention is one, any or all of prior embodiments in this paragraph up through the first embodiment in this paragraph, wherein the first separated hydrocarbon stream comprising $C_7$ hydrocarbons may be adjusted to include a portion of the second separated hydrocarbon stream comprising $C_{8+}$ hydrocarbons. An embodiment of the invention is one, any or all of prior embodiments in this paragraph up through the first embodiment in this paragraph, further comprising feeding the first isomerization reaction zone effluent stream to a deisohexanizer to form a deisohexanizer effluent stream that may be recycled to the first isomerization reaction zone. An embodiment of the invention is one, any or all of prior embodiments in this paragraph up through the first embodiment in this paragraph, further comprising feeding the first hydrocarbon feed stream comprising mainly $C_5$-$C_6$ hydrocarbons to a deisopentanizer to form a deisopentanizer effluent stream wherein the deisopentanizer effluent stream is passed to the first isomerization reaction zone. An embodiment of the invention is one, any or all of prior embodiments in this paragraph up through the first embodiment in this paragraph, wherein the second isomerization reaction zone effluent stream may be recycled and passed into the first isomerization reaction zone. An embodiment of the invention is one, any or all of prior embodiments in this paragraph up through the first embodiment in this paragraph, wherein the first isomerization reaction zone comprises at least one reactor. An embodiment of the invention is one, any or all of prior embodiments in this paragraph up through the first embodiment in this paragraph, wherein the first isomerization reaction zone operates at a temperature from about 110° C. (230° F.) to about 204° C. (400° F.). An embodiment of the invention is one, any or all of prior embodiments in this paragraph up through the first embodiment in this paragraph, wherein the pressure of the first isomerization reaction zone is between about 250 Psig to about 600 Psig. An embodiment of the invention is one, any or all of prior embodiments in this paragraph up through the first embodiment in this paragraph, wherein the second isomerization reaction zone comprises at least one reactor. An embodiment of the invention is one, any or all of prior embodiments in this paragraph up through the first embodiment in this paragraph, wherein the second isomerization reaction zone operates at a temperature from about 98° C. (210° F.) to about 149° C. (300° F.). An embodiment of the invention is one, any or all of prior embodiments in this paragraph up through the first embodiment in this paragraph, wherein the pressure of the second isomerization reaction zone is between about 250 Psig to about 450 Psig. An embodiment of the invention is one, any or all of prior embodiments in this paragraph up through the first embodiment in this paragraph, wherein the reforming zone comprises at least one reactor. An embodiment of the invention is one, any or all of prior embodiments in this paragraph up through the first embodiment in this paragraph, wherein the reforming zone operates at a temperature from about 371° C. (700° F.) to about 1050° C. (1922° F.). An embodiment of the invention is one, any or all of prior embodiments in this paragraph up through the first embodiment in this paragraph, wherein the pressure of the reforming zone is between about 10 Psig to about 300 Psig. An embodiment of the invention is one, any or all of prior embodiments in this paragraph up through the first embodiment in this paragraph, wherein the first isomerization catalyst and the second isomerization catalyst comprise a chlorided alumina. An embodiment of the invention is one, any or all of prior embodiments in this paragraph up through the first embodiment in this paragraph, wherein the first isomerization catalyst and the second isomerization catalyst comprise a zirconia-containing catalyst. An embodiment of the invention is one, any or all of prior embodiments in this paragraph up through the first embodiment in this paragraph, wherein the reforming zone comprises a silicalite based adsorbent.

A second embodiment of the invention is an apparatus for isomerizing and reforming hydrocarbons, wherein the apparatus comprises a first isomerization unit adapted to receive and isomerize a first hydrocarbon stream in the presence of a first isomerization catalyst and hydrogen under first isomerization conditions to produce a first isomerized stream; a reforming unit adapted to receive and reform the second hydrocarbon stream in the presence of a reforming zone adsorbent under reforming zone conditions to produce a reformed stream; and a second isomerization unit adapted to receive and isomerize the reformed stream in the presence of a second isomerization catalyst and hydrogen under second isomerization conditions to produce a second isomerized stream. An embodiment of the invention is one, any or all of prior embodiments in this paragraph up through the second embodiment in this paragraph, further comprising a deisohexanizer in fluid communication with the first isomerization zone for receiving the first isomerized stream, wherein the deisohexanizer is adapted to fractionate the first isomerized stream into a first product stream comprising branched hydrocarbons having less than or equal to 6 carbon atoms and linear hydrocarbons having less than or equal to 5 carbon atoms, a normal hexane-enriched stream, and a second heavy fractionation stream comprising hydrocarbons having at least 7 carbon atoms. An embodiment of the invention is one, any or all of prior embodiments in this paragraph up through the second embodiment in this paragraph, further comprising a deisoheptanizer in fluid communication with the second isomerization zone for receiving the second heavy fractionation stream, wherein the deisoheptanizer is adapted to fractionate the second heavy fractionation stream into a second product stream comprising branched hydrocarbons having less than or equal to 7 carbon atoms, a normal heptane-enriched stream, and a third heavy fractionation stream comprising cyclic hydrocarbons having at least 7 carbon atoms, wherein the normal heptane-enriched stream is combined with the second hydrocarbon stream.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A method for isomerizing and reforming hydrocarbons comprising:
  feeding a feed stream comprising $C_{5+}$ hydrocarbons to a splitter to form a first hydrocarbon stream comprising mainly $C_5$-$C_6$ hydrocarbons and a second hydrocarbon stream comprising mainly $C_{7+}$ hydrocarbons;
  feeding the first hydrocarbon stream comprising mainly $C_5$-$C_6$ hydrocarbons to a first isomerization reaction zone comprising a first isomerization catalyst to form a first isomerization reaction zone effluent stream;

feeding the first isomerization reaction zone effluent stream to a deisohexanizer to form a deisohexanizer effluent stream comprising compounds boiling at a lower temperature than cyclohexane that is recycled to the first isomerization reaction zone;

feeding the second hydrocarbon stream comprising mainly $C_{7+}$ hydrocarbons to a reforming zone to form a reforming zone effluent stream;

feeding the reforming zone effluent stream to a separator to form a first separated hydrocarbon stream comprising $C_7$ hydrocarbons and a second separated hydrocarbon stream comprising $C_{8+}$ hydrocarbons; and feeding the first separated hydrocarbon stream comprising $C_7$ hydrocarbons to a second isomerization reaction zone comprising a second isomerization catalyst to form a second isomerization reaction zone effluent stream.

2. The method of claim 1, wherein the first separated hydrocarbon stream comprising $C_7$ hydrocarbons is adjusted to include a portion of the second separated hydrocarbon stream comprising $C_{8+}$ hydrocarbons.

3. The method of claim 1, further comprising feeding the first hydrocarbon feed stream comprising mainly $C_5$-$C_6$ hydrocarbons to a deisopentanizer to form a deisopentanizer effluent stream comprising a bottoms stream comprising normal pentane that is passed to the first isomerization reaction zone.

4. The method of claim 1, wherein the first isomerization reaction zone comprises at least one reactor.

5. The method of claim 1, wherein the first isomerization reaction zone operates at a temperature from about 110° C. (230° F.) to about 204° C. (400° F.).

6. The method of claim 1, wherein the pressure of the first isomerization reaction zone is between about 250 Psig to about 600 Psig.

7. The method of claim 1, wherein the second isomerization reaction zone comprises at least one reactor.

8. The method of claim 1, wherein the second isomerization reaction zone operates at a temperature from about 98° C. (210° F.) to about 149° C. (300° F.).

9. The method of claim 1, wherein the pressure of the second isomerization reaction zone is between about 250 Psig to about 450 Psig.

10. The method of claim 1, wherein the reforming zone comprises at least one reactor.

11. The method of claim 1, wherein the reforming zone operates at a temperature from about 371° C. (700° F.) to about 1050° C. (1922° F.).

12. The method of claim 1, wherein the pressure of the reforming zone is between about 10 Psig to about 300 Psig.

13. The method of claim 1, wherein the first isomerization catalyst and the second isomerization catalyst comprise a chlorided alumina.

14. The method of claim 1, wherein the first isomerization catalyst and the second isomerization catalyst comprise a zirconia-containing catalyst.

15. The method of claim 1, wherein the reforming zone comprises a silicalite based adsorbent.

16. A method for isomerizing and reforming hydrocarbons comprising:

feeding a feed stream comprising $C_{5+}$ hydrocarbons to a splitter to form a first hydrocarbon stream comprising mainly $C_5$-$C_6$ hydrocarbons and a second hydrocarbon stream comprising mainly $C_{7+}$ hydrocarbons;

feeding the first hydrocarbon stream comprising mainly C5-C6 hydrocarbons to a first isomerization reaction zone comprising a first isomerization catalyst to form a first isomerization reaction zone effluent stream;

feeding the second hydrocarbon stream comprising mainly C7+ hydrocarbons to a reforming zone to form a reforming zone effluent stream;

feeding the reforming zone effluent stream to a separator to form a first separated hydrocarbon stream comprising C7 hydrocarbons and a second separated hydrocarbon stream comprising C8+ hydrocarbons; and feeding the first separated hydrocarbon stream comprising $C_7$ hydrocarbons to a second isomerization reaction zone comprising a second isomerization catalyst to form a second isomerization reaction zone effluent stream;

wherein the second isomerization reaction zone effluent stream is recycled and passed into the first isomerization reaction zone.

17. The method of claim 16, further comprising feeding the first hydrocarbon feed stream comprising mainly $C_5$-$C_6$ hydrocarbons to a deisopentanizer to form a deisopentanizer effluent stream comprising a bottoms stream comprising normal pentane that is passed to the first isomerization reaction zone.

18. The method of claim 16, wherein the first isomerization catalyst and the second isomerization catalyst comprise a chlorided alumina.

19. The method of claim 16, wherein the first isomerization catalyst and the second isomerization catalyst comprise a zirconia-containing catalyst.

20. The method of claim 16, wherein the reforming zone comprises a silicalite based adsorbent.

* * * * *